United States Patent [19]
White

[11] Patent Number: 5,061,379
[45] Date of Patent: Oct. 29, 1991

[54] ROTATION INDICATOR FOR OIL FILTER MOUNTING IN ENGINE BLOCK

[76] Inventor: Dennis J. White, 51 Nostrand Rd., Cranbury, N.J. 08512

[21] Appl. No.: 594,605

[22] Filed: Oct. 9, 1990

[51] Int. Cl.$^5$ ............................................. B01D 35/02
[52] U.S. Cl. ........................... 210/767; 116/201; 116/300; 116/316; 116/DIG. 42; 123/196 A; 184/1.5; 184/6.24; 210/91; 210/232; 210/DIG. 17; 210/168
[58] Field of Search ............... 116/200, 201, 300, 301, 116/308, 309, 316, 304, 328, 329, DIG. 42; 123/196 A; 184/1.5, 6.24; 210/85, 91, 232, 168, 541, 767, DIG. 17; 74/813 R; 269/67

[56] References Cited

U.S. PATENT DOCUMENTS 3,197,029 7/1965 Yelinek et al. ............. 116/DIG. 42
3,224,585 12/1965 Scavuzzo et al. .......... 210/DIG. 17

Primary Examiner—Robert A. Dawson
Assistant Examiner—Joseph Drodge

[57] ABSTRACT

A system for measured tightening of an oil filter to an engine block mount includes an array of clocks placed circumferential around oil filter (20). Each clock has one dark hand (26) and one light hand (28). The light hand is advanced of the dark hand. The degree of tightening is determined by amount of separation between hands. As filter is rotated, next clock coming into view, has hands positioned one hour advanced (4-13). Panoramic movement of hands as filter is turned will indicate degree of rotation and tightening.

5 Claims, 6 Drawing Sheets

ROTATION INDICATOR FOR OIL FILTER MOUNTING IN ENGINE BLOCK

TECHNICAL FIELD

This invention relates to tightening automotive oil filter, and more particularly, a visual guide to assist technician in determining filter rotation.

BACKGROUND ART

A number of arrangements for indexed rotation are known in the prior art. Many disclosures are related to lathes, or revolving tables for machining.

A. R. Brualt's U.S. Pat. No. 3,380,322 Apr. 30, 1968 describes a technique for rapidly and accurately setting angular indexed work. Angles are set with aid of a fixed index. It is necessary to set indexing sliding member 12. It is not continually variable and is not automatically indexed.

Alan Pearson and U.S. Pat. No. 2,524,538 Oct. 3, 1950 describes an indexing device utilizing many pins circumferentially placed about a work table. Arc positioning is only referenced to one pin at a time. Only small angles of an arc are measured.

W. Shotey's U.S. Pat. No. 3,088,340 May 7, 1963 and E. S. Firestone et. al. U.S. Pat. No. 3,177,740 Apr. 13, 1965 feature ball bearing indexing. This technique allows for definitive placement but relies on conventional scales for measuring arc and is not continuously variable.

H. M. Minnis' U.S. Pat. No. 617,689 Jan. 10, 1899 relies on an array of clocks with different time designations. This arrangement measures activity with cyclical passage of time. It does not relate to movement but only scheduling.

The adjustment knob of W. H. Vogt's U.S. Pat. No. 2,220,590 Nov. 5, 1940 reveals degree of rotation about a fixed index. It is not continually variable.

The Meditimer of Villa-Real's U.S. Pat. No. 4,345,541 Aug. 24, 1982 relies on setting the last dose time. Simultaneously, another set point reveals the next dosage time. The user rotates an index between two set fixed points.

The above inventors are not dealing with the problem of beginning a measurement of rotation at any possible random point. Monitoring the tightness of an oil filter is a specific application. A guide is needed to assure confidence of the operator.

DISCLOSURE OF THE INVENTION

In accordance with the present invention, a guide for tightening an oil filter is provided.

Twelve clock faces are equally spaced about the peripheral of the oil filter canister. Either on side as in FIG. 1 or on end as in FIG. 2.

Each clock has two hands one light and one dark. If the rotation to be measured is a three-quarter turn then the hands are placed such that the light hand is three-quarter ahead of a full rotation on the clock than the dark hand on each clock. As the filter is rotated each new clock coming to view has hands place one hour advanced of the previous clock.

The filter is turned till gasket meets engine block base. From any set reference the position of hands is now noted on nearest most visible clock. The filter is slowly tightened until the dark hand panoramically reaches the same referenced position as the light hand, three-quarter turn.

The exact degree of rotation can be varied as the arc difference between dark and light hands. A half turn would be guided by clocks with light and dark hands set six hours apart.

Most manufactures of oil filters provide instructions to rotate filter three-quarter turn after filter seal first touches engine block base. None of these filters are indexed to reveal a three-quarter rotation.

OBJECTS AND ADVANTAGES

Figure 1:
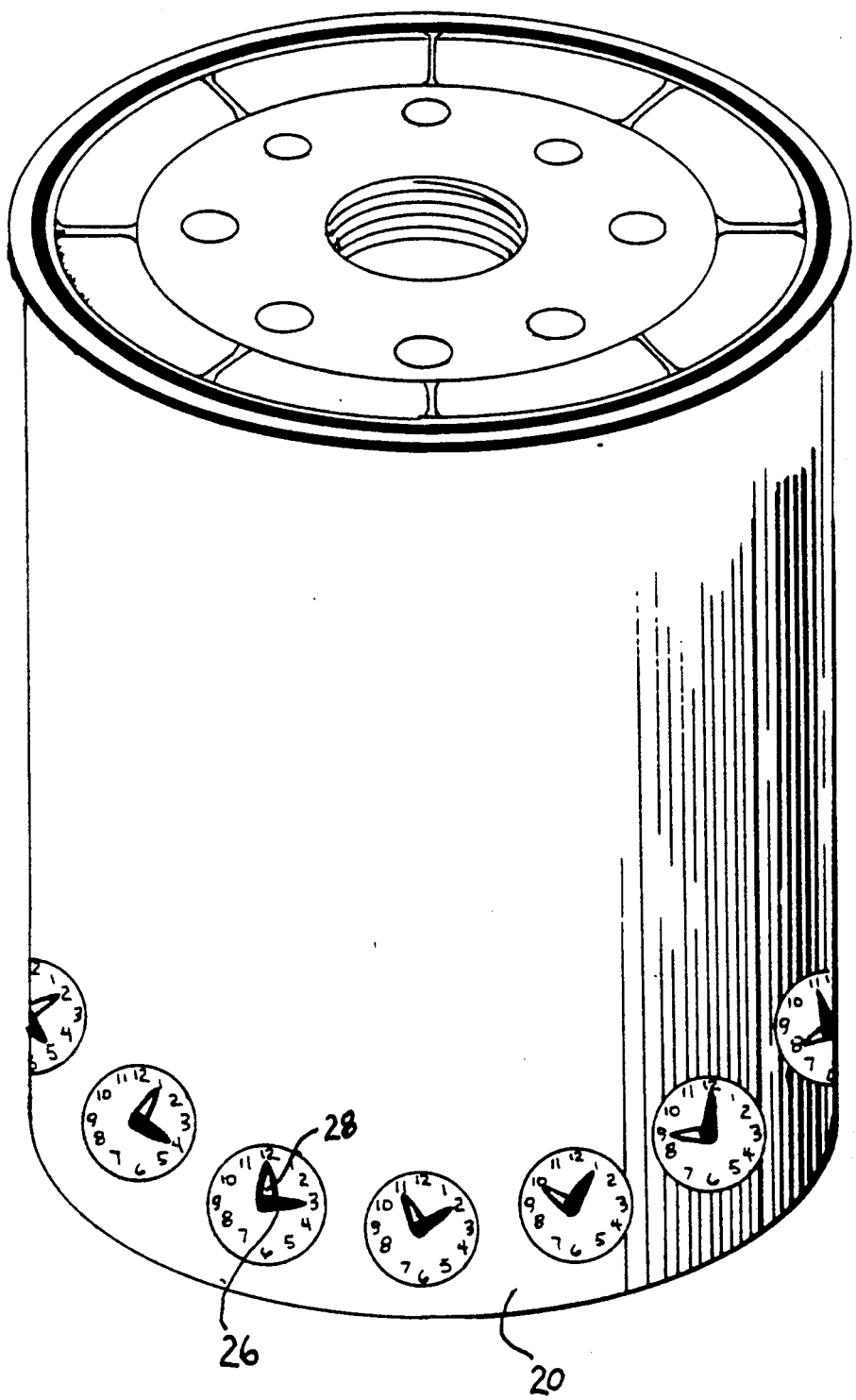
FIG. 1: Side-view of oil filter showing clocks place on side of filter.
Figure 2:
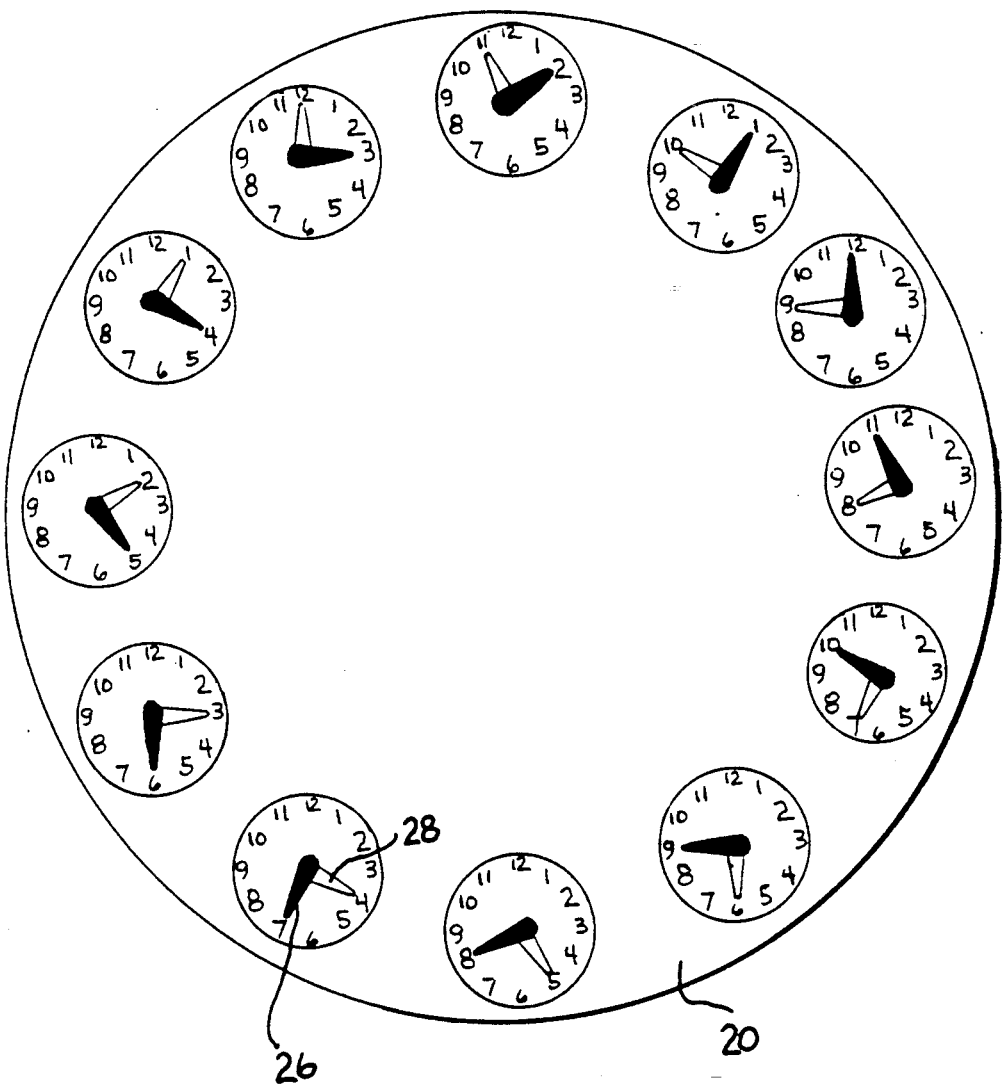
FIG. 2: Closed end of filter with twelve clocks about periphery. Position of hands are nine hours apart.
Figure 3:
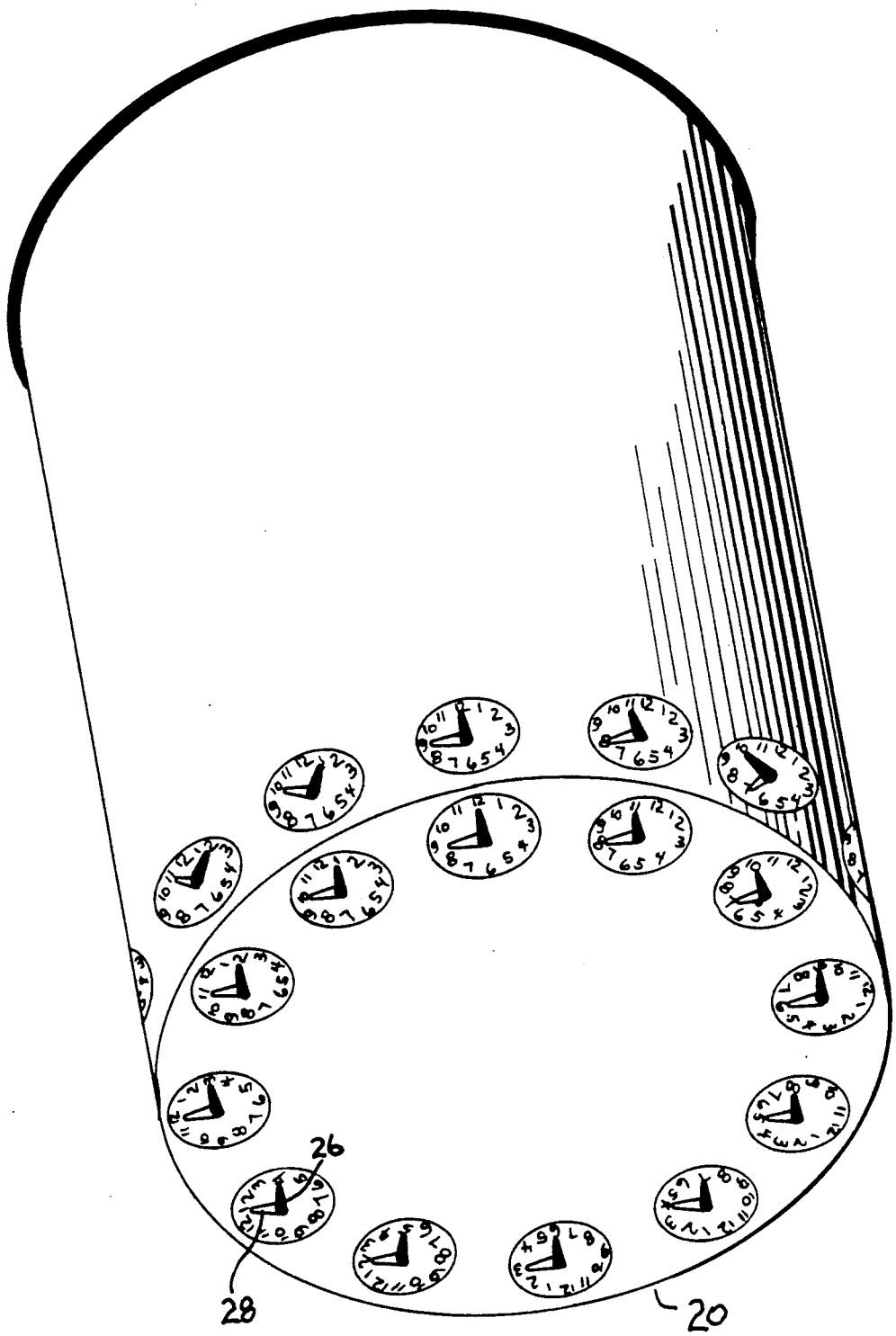
FIG. 3: Shows oblique view of automotive spin-on oil filter. Position of clock symbols are on outer side of filter near end. Another complete array are on the closed end of filter.
Figure 4:
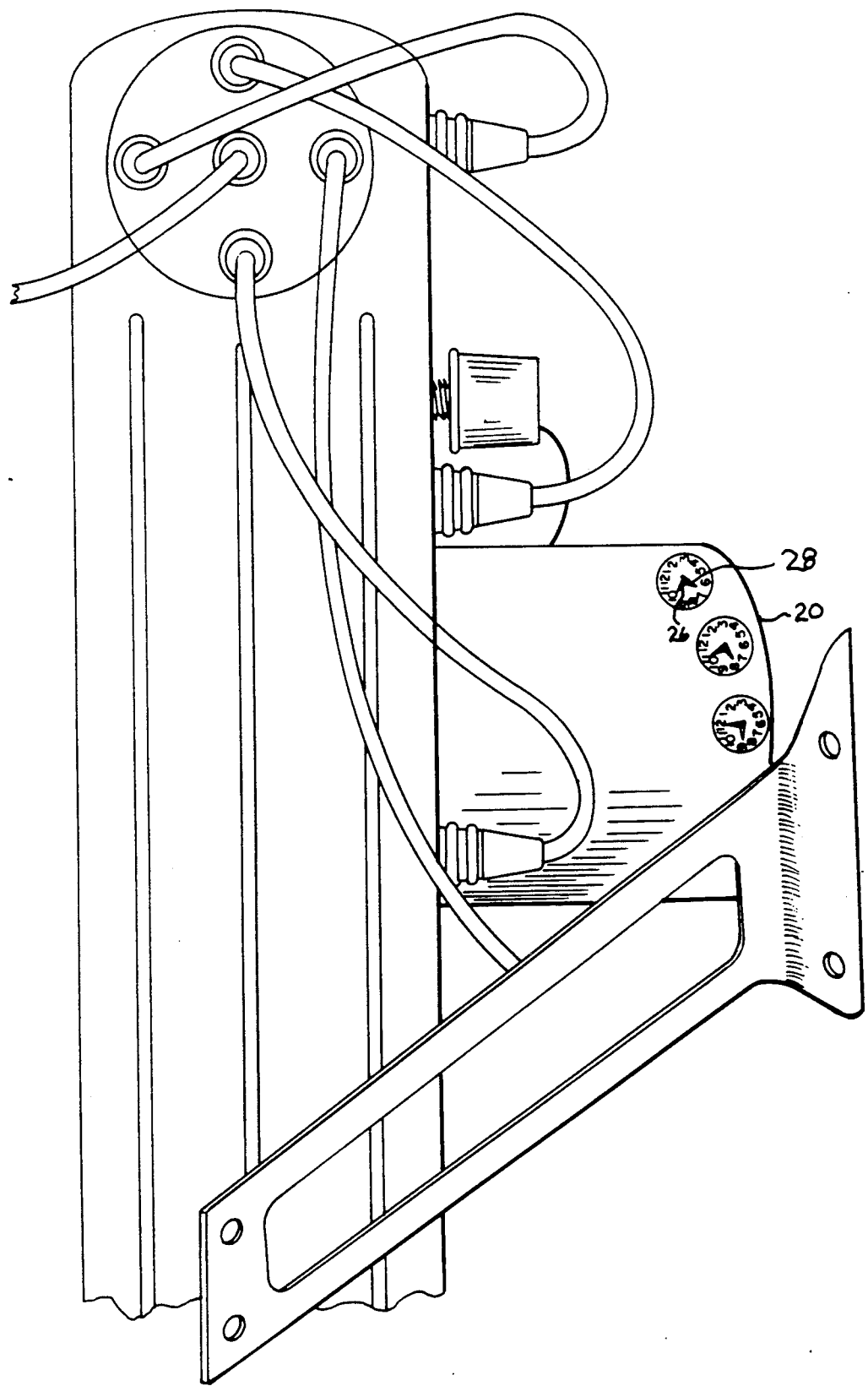
FIG. 4: View of automotive engine with filter 20. Filter has been turned to first contact between filter seal and engine block filter base. On clock closest to bracket, light hand is at nine o'clock and dark hand is at twelve o'clock.
Figure 5:
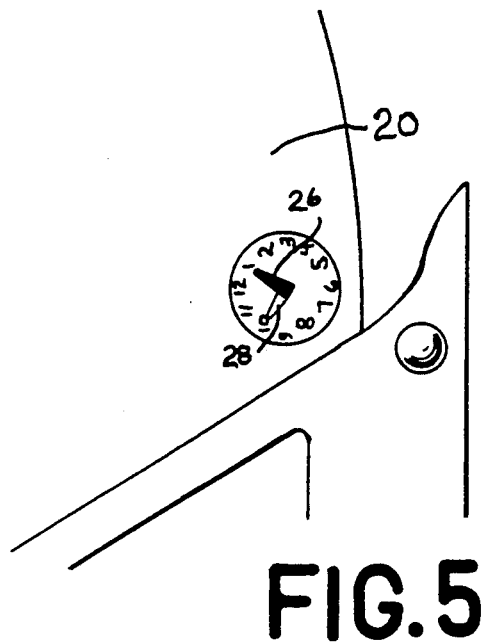
FIGS. 5 to 13: Presents a panorama of movement of the dark hand form the twelve o'clock position to the nine o'clock position as the filter is rotated clockwise three-quarter turn.
Figure 6:
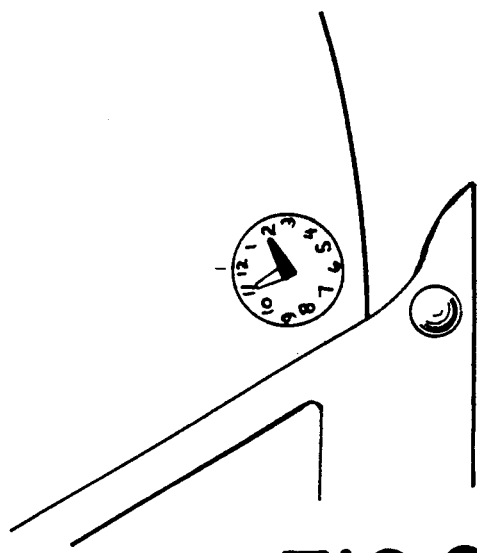
Figure 7:
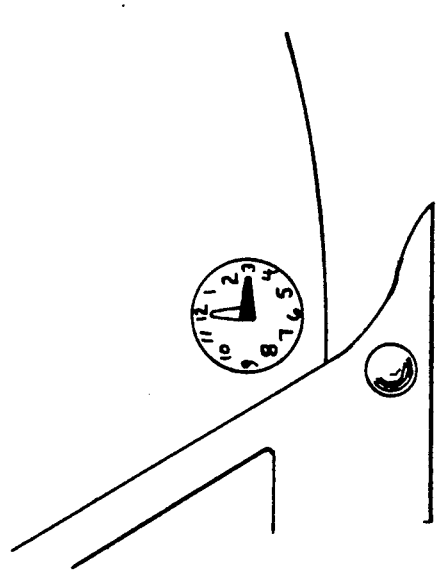
Figure 8:
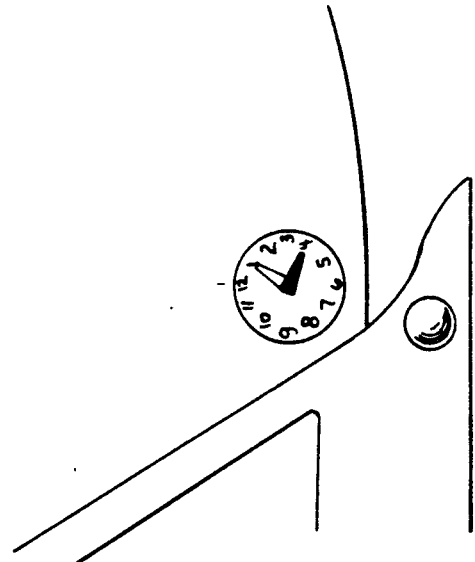
Figure 9:
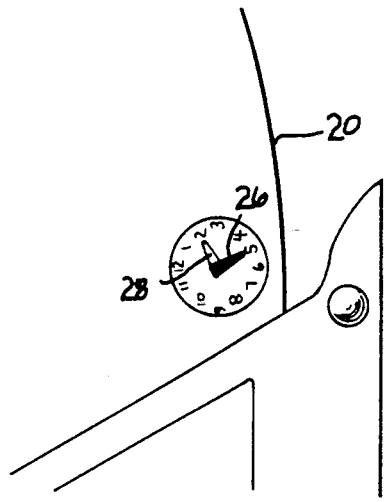
Figure 10:
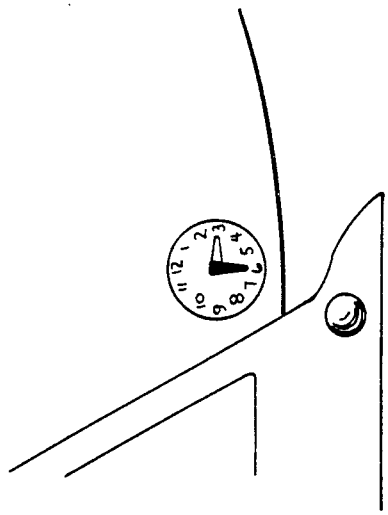
Figure 11:
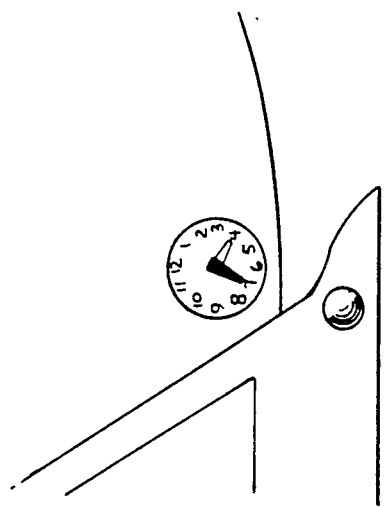
Figure 12:
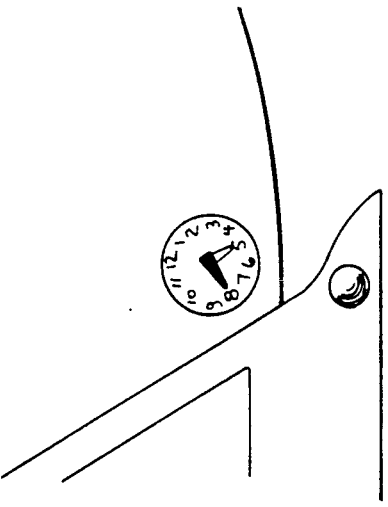
Figure 13:
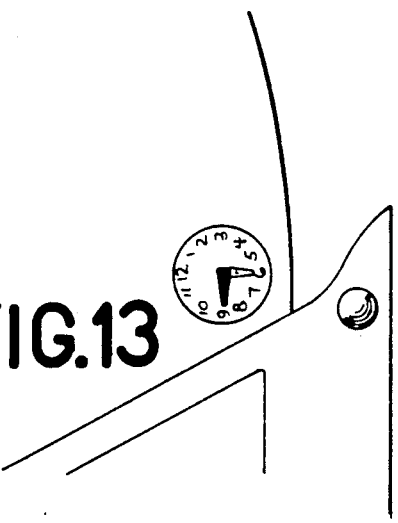

Indexed rotation will aid tightening a filter predictably. A loose filter leaks. An over-tightened filter is very troublesome to remove and could result in loss of time, damage to structures or injury to operator.

This disclosure is a passive guide, it does not have to be utilized. If it is, it does not require special tools or extra time. It will decrease installation time and add to confidence of operator. There is little appreciable added cost to manufacture.

While my above description contains specificities, these should not be construed as limitations on the scope of the invention. But rather as an exemplification of one preferred embodiment there of. For example, other filters require similar tightening techniques such as fuel filters and chemical filters used in agriculture and industry.

The array of clocks may be made on sticky tape to be affixed to specialized equipment in the field. For example, a steam fitter may need a certain degree of rotation after a joint has reached a particular torque reading.

Conversely, the array of clocks may be made removable after use. An example would be securing a fine delicate porcelain lamp to a base.

Measured rotation may be varied. 24 clock's equally positioned peripherally about a workpiece would be used for rotation measurements of 15 degrees. Adjacent clocks would have hands in half hour differences.

I claim:

1. A method of measured tightening of an oil filter, having a plurality of adjustable clocks rotation-indicating speed around its periphery, to an engine block base, the clocks each having a first hand and a second hand, comprising:

a) rotating the filter until an initial meeting of a gasket or seal, associated with the filter, with the engine block base occurs;

b) noting the relative positions of a first hand and a second hand of a selected one of said clocks at a reference point with respect to the filter and c) continuing to rotate the filter until a first hand of another of a series of sequentially appearing members of said clocks, at said reference point, has the same relative position as the second hand of said one clock.

2. Apparatus for measured tightening of an oil filter comprising:

an oil filter having means comprising an array of adjustable clocks, equally spaced around a periphery of said filter, for indicating a rotational position and degree of tightening of said filter relative to mounting on an engine block filter mount.

3. The oil filter of claim 2, wherein said array of clocks each has one dark hand.

4. The oil filter of claim 3, wherein each of said clocks further comprises one light hand adjusted a selected interval in advance of said dark hand.

5. The oil filter of claim 2, wherein said array of clocks are adjusted such that both of a first hand and a second hand of each sequential clock in said array are positioned on hour in advance of respective first and second hands of respective preceding clocks.

* * * * *